United States Patent
Gerstberger (10) Patent No.: US 9,080,455 B2
(45) Date of Patent: Jul. 14, 2015

(54) ROTOR DEVICE FOR A JET ENGINE WITH A DISK WHEEL AND SEVERAL ROTOR BLADES

(75) Inventor: Ulf Gerstberger, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 573 days.

(21) Appl. No.: 13/493,230

(22) Filed: Jun. 11, 2012

(65) Prior Publication Data

US 2012/0321477 A1 Dec. 20, 2012

(30) Foreign Application Priority Data

Jun. 14, 2011 (DE) .......................... 10 2011 077 501

(51) Int. Cl.
*F01D 5/30* (2006.01)
*F01D 5/32* (2006.01)

(52) U.S. Cl.
CPC .............. *F01D 5/3015* (2013.01); *F01D 5/326* (2013.01); *F05D 2250/11* (2013.01); *F05D 2260/36* (2013.01); *Y02T 50/671* (2013.01)

(58) Field of Classification Search
CPC ........ F01D 5/3015; F01D 5/32; F01D 5/3007
USPC .......................................... 416/220 R, 219 R
See application file for complete search history.

(56) References Cited

U.S. PATENT DOCUMENTS

| | | | | |
|---|---|---|---|---|
| 3,501,249 A | * | 3/1970 | Scalzo et al. ..................... 416/95 |
| 4,466,776 A | * | 8/1984 | Camboulives ................. 416/221 |
| 4,480,958 A | * | 11/1984 | Schlechtweg ............. 416/220 R |
| 4,730,983 A | * | 3/1988 | Naudet et al. ............. 416/220 R |
| 4,872,810 A | * | 10/1989 | Brown et al. ................. 416/145 |
| 5,339,619 A | * | 8/1994 | Antonellis ....................... 60/772 |
| 2010/0215501 A1 | | 8/2010 | Ammann | |

FOREIGN PATENT DOCUMENTS

| DE | 689 08 676 | 12/1993 |
|---|---|---|
| GB | 2 194 000 | 2/1988 |

OTHER PUBLICATIONS

German Search Report dated Apr. 26, 2012 from counterpart application.

* cited by examiner

*Primary Examiner* — Dwayne J White
*Assistant Examiner* — Jason Fountain
(74) *Attorney, Agent, or Firm* — Timothy J. Klima; Shuttleworth & Ingersoll, PLC (57) ABSTRACT

The present invention proposes a rotor device for a jet engine with a disk wheel and several rotor blades connected to said disk wheel, with the rotor blades being arranged in each case via a blade root substantially in the axial direction inside recesses of the disk wheel. Several locking segments are provided in the recesses of the disk wheel for axially locking the rotor blades, said locking segments interacting on the one hand with grooves of the rotor blades and on the other hand with at least one groove of the disk wheel. In the area of the groove of at least one of the rotor blades between the groove of the rotor blade and a locking segment there is a positive fit preventing a relative movement between the rotor blades and the locking segments.

18 Claims, 5 Drawing Sheets

ROTOR DEVICE FOR A JET ENGINE WITH A DISK WHEEL AND SEVERAL ROTOR BLADES

This application claims priority to German Patent Application DE102011077501.3 filed Jun. 14, 2011, the entirety of which is incorporated by reference herein.

This invention relates to a rotor device for a jet engine with a disk wheel and several rotor blades connected to said disk wheel.

Jet engines with turbine designs are known from practice in which rotor blades are each arranged using so-called fir-tree roots in locating rails of the disk wheel, with the locating rails extending in the axial direction in the disk wheel. To secure the rotor blades in this position in the axial direction and also to ensure the lowest possible leakage flows in the air system during operation of the jet engine, a locking ring designed with several locking segments arranged next to one another in the circumferential direction of the disk wheel is provided. The locking segments are braced in operation under the weight load onto one or more rotor blades. The locking segments are mounted in the radial direction at one end in grooves arranged underneath the inner shroud of the rotor blades and at the other end in a groove provided in the disk wheel. The locking segment surfaces facing the grooves of the rotor blades and engaging in said grooves are designed concentric to a center of the disk wheel. The rotor blade groove surfaces facing the locking segments are usually designed in a straight line.

In each case a position and extent of a contact area between the concentric surface of a locking segment facing the groove in the rotor blades and the straight-line surface of the groove of a facing rotor blade facing the locking segment is disadvantageously not clearly defined, since the contact area between a locking segment and a rotor blade can self-adjust during operation of the jet engine. Furthermore, it is also possible that a contact surface between a locking segment and a rotor blade alters, substantially depending on a position of said rotor blade relative to a circumferential contour of the associated locking segment of the locking ring, since the position of the locking segments relative to the rotor blades in the circumferential direction during operation of the jet engine can shift due to a relative movement between the rotor blades fixed in the circumferential direction of the disk wheel and the locking segments displaceable inside the grooves in the circumferential direction of the disk wheel.

The relative movement between the locking segments and the rotor blades may lead to the contact area between a rotor blade and a locking segment being arranged off-center in the circumferential direction relative to a fir-tree root of the rotor blade, leading to an unfavourable load application position. In a case like this, additional bending stresses and bending moments act on the fir-tree root, which are particularly high in the case of rotor blades with a large platform overhang, shortening the service lives of the rotor blades and of the disk wheel to an undesirable extent.

To obtain a defined contact area between the rotor blade and the locking segment and to avoid or reduce the bending stresses as described, locking segments in profiled design are known. To secure a position of the locking segments relative to the rotors in the circumferential direction of the disk wheel, they are secured against rotation during operation using bolts and pins. This measure however causes high manufacturing costs.

The object underlying the present invention is therefore to provide a rotor device for a jet engine with a disk wheel and several rotor blades connected to said disk wheel and locked in the axial direction relative to the disk wheel using locking segments, where the locking segments are secured in a simple manner against rotation relative to the rotor blades and where a defined contact area is provided in each case between the locking segments and the rotors over the entire operating range of the rotor device.

It is a particular object of the present invention to provide solution to the above problems by a rotor device designed in accordance with the features described herein.

In the rotor device in accordance with the invention for a jet engine with a disk wheel and several rotor blades connected to said disk wheel, the rotor blades are arranged in each case via a blade root substantially in the axial direction inside recesses of the disk wheel, with several locking segments being provided in the recesses of the disk wheel for axially locking the rotor blades, said locking segments interacting on the one hand with grooves of the rotor blades in defined contact areas and on the other hand with at least one groove of the disk wheel.

In accordance with the invention, there is a positive fit preventing a relative movement between the rotor blades and the locking segments in the area of the groove of at least one of the rotor blades between the groove of the rotor blade and a locking segment, i.e. a contour of the locking segments facing the rotor blades and a contour of the rotor blade groove facing the locking segments are designed matching one another for prevention of rotation of the locking segments relative to the rotor blades.

Hence a rotation of the locking segments of the locking ring relative to the rotor blades, in particular during operation of the rotor device, is prevented by a simple design without additional means for fixing the locking segments relative to the rotor blades, such that assembly of the locking segments can be performed easily and quickly and in each case a defined contact area between the locking segments and the rotor blades is preserved over the entire operating range of the device. Costs for the production of the locking segments can also be lower than for locking segments with a profiled contour as known from the state of the art, since several consecutive production steps are required for manufacture of this profiled contour.

The rotor device in accordance with the invention can be used for a variety of engine designs and is applied in particular for any required stage of a turbine. Furthermore, the rotor device in accordance with the invention can for example also be used in a compressor or a fan of an engine.

In a simply designed and cost-effectively producible version of a rotor device in accordance with the invention, an area of the rotor blade groove facing a locking segment is designed in particular with a tooth-shaped profiled body.

A relative movement between the rotor blade and the locking segment is, in an advantageous development of the invention, prevented by a profiled body having a triangular area forming for that purpose a stop area for a triangular cutout of the locking segment correlating to the triangular area of the profiled body.

In an embodiment of a rotor device that assures in each case a defined contact area between the rotor blades and the locking segments, and hence a favourable force application, with an anti-rotation protection of the locking segments relative to the rotor blades, it is provided that the triangular area of the profiled body in the cross-section is formed by rotor blade edges intersecting at an intersection point, where a first rotor blade edge is inclined in the circumferential direction of the rotor blade relative to a platform of the rotor blade, and a second rotor blade edge extends in the direction of the groove bottom, starting from that intersection point of the rotor blade edges extending furthest in the radial direction from a groove bottom, and where the triangular cutout of the locking segment in the cross-section is formed by two locking segment edges intersecting at an intersection point and the profiled body for anti-rotation protection of the rotor blade relative to the locking segment forms a stop for the locking segment in the area of the intersection point and interacts in this area at least approximately with a locking segment area enclosing the intersection point of the locking segment.

That point of the first rotor blade edge furthest distant in the radial direction from the bottom of the groove of a rotor blade forms a defined contact point for an associated locking segment, where said locking segment is braced on the profiled body in the area of said point against an unwelcome rotation in the circumferential direction of the disk wheel relative to the rotor blade. Due to the rotor blade groove surface inclined relative to a lower edge of the inner shroud of the rotor blade and facing in the direction of the locking segment, together with the angled arrangement of the rotor blade edges or the locking segment edges relative to one another, a reliable anti-rotation protection of the locking segment relative to the rotor blade is obtained, where position locking is assured even with higher production tolerances.

In an advantageous development of a rotor device in accordance with the invention, the first locking segment edge of the locking segment runs, in order to form a contact area between the rotor blade and the locking segment, in some areas parallel to the first rotor blade edge of the profiled body of the rotor blade. By this embodiment, a defined area is created in a simple manner inside which a contact between the locking segment and the rotor blade is obtained in particular in an operating state of the rotor device. Compared with known designs in which the groove of the rotor blade is manufactured in a single work process and excess material in the area of the groove or the blade root, respectively, is left there or is removed in a further work process, the production costs and/or the weight of the rotor blade can be reduced by the solution in accordance with the invention. A weight reduction is in particular made possible in that non-load-bearing material of the rotor blade can be removed thanks to the positioning/inclination of the profiled body of the groove and the creation of a defined contact area between the locking segment and the rotor blade.

In an advantageous development of the invention, a center of the contact area of the first locking segment edge and of the first rotor blade edge is arranged at least approximately centrally to the blade root of the rotor blade in the circumferential direction of the rotor device. By an arrangement of this type of the blade root, bending stresses that act on said blade root and arise from a force off-center relative to the blade root and applied on the rotor blade can be reduced or completely prevented.

Since the rotor blades and the locking segments accordingly have to withstand only low bending stresses or none at all, the rotor blades and the locking segments can advantageously be designed lightweight and/or have a longer service life. The locking segments can be designed for example with cutout holes for weight reduction. A service life gain is particularly great in rotor blades with a large platform overhang, for example in rotor devices with low numbers of rotor blades, since with these devices particularly large bending stresses can be avoided due to the large platform overhang.

In particular to allow the provision of a contact area of the locking segment with the rotor blade in a desired circumferential area of the rotor blade, it is provided in a simple embodiment of the rotor device in accordance with the invention that an intersection point of the first rotor blade edge with the second rotor blade edge is arranged in a rim area of the rotor blade.

For definition of a contact area having a desired length between the rotor blade and the locking segment, said locking segment can have in cross-section a third locking segment edge which relative to the intersection point of the first locking segment edge and the second locking segment edge adjoins the first locking segment edge in the facing-away direction, with the third locking segment edge extending at a distance from the first rotor blade edge, in particular due to an angular arrangement thereto. The distance between the third locking segment edge and the first rotor blade edge is low here in particular, so that the third locking segment edge in a transitional area between two adjacent rotor blades approaches in the radial direction very close to the bottom of the groove of the rotor blade and hence allows a good sealing effect to be achieved. The use of additional sealing and/or damping devices between adjacent rotor blades can as a result be dispensed with, or the sealing and/or damping devices can be designed particularly small and/or simple.

In an advantageous development of a rotor device in accordance with the invention, the third locking segment edge extends in the circumferential direction of the rotor device beyond a transitional area of adjacent rotor blades, so that a sealing effect of the locking segments is further improved.

The second locking segment edge runs, in an advantageous design of a rotor device in accordance with the invention, at a distance from the second rotor blade edge, in particular due to an angled arrangement relative to the second rotor blade edge, such that a contact of the profiled body with the locking segment in the area of the second rotor blade edge and the second locking segment edge is prevented.

In an embodiment of the invention that can easily be manufactured, one edge or in particular all edges of the rotor blade and/or of the locking segment run(s) at least approximately in a straight line. Alternatively however, curved shapes of the respective edges can be provided, where the shapes of the edges are in each case matched to one another in order to obtain the advantages described above.

In order to generate only low forces acting on a single profiled body with anti-rotation protection of the locking segments relative to the rotor blades, several and in particular all rotor blades can have a groove with a profiled body and in each case interact with a locking segment area enclosing a triangular cutout. The locking segments can here be designed with an area enclosing a triangular cutout and interact with a single rotor blade. Alternatively, a locking segment can have several areas enclosing triangular cutouts and extend over several, in particular two or three rotor blades and interact with the rotor blades by their profiled bodies.

To permit insertion of the locking segments in simple manner into the groove of the rotor blade and the groove of the disk wheel, the locking segments have, in a simply designed embodiment of the rotor device in accordance with the invention, at least one extension in an area facing the groove of the disk wheel, said extension being movable, in particular bendable, between a first position for insertion of the locking segment into the rotor device and a second position with the locking segment inserted, where a radial extent of the locking segment is greater when the extension is in the second position than is the case when the extension is in the first position.

Alternatively, a spacer element, in particular a wire, running in the circumferential direction of the rotor device can be arranged in the radial direction between the locking segment and the groove of the disk wheel.

For axial locking and/or sealing of the rotor blades relative to the disk wheel, locking segments can, in a development of the invention, be arranged in the axial direction on both sides of the rotor blades, said segments being provided in grooves of the rotor blades and in at least one groove of the disk wheel.

To achieve an improved sealing effect between adjacent rotor blades, it is provided in an advantageous development of a rotor device in accordance with the invention that at least one sealing and/or damping element is arranged in the area of a gap between inner shrouds of two adjacent rotor blades.

The features stated in the following exemplary embodiments of the rotor device in accordance with the invention are each suitable, singly or in any combination with one another, to develop the subject matter of the invention. The respective feature combinations do not represent any restriction with regard to the development of the subject matter in accordance with the invention, but have substantially only an exemplary character.

Further advantages and advantageous embodiments of the rotor device in accordance with the invention become apparent from the exemplary embodiments described in principle in the following with reference to the accompanying drawing. In the drawing.

Figure 1:
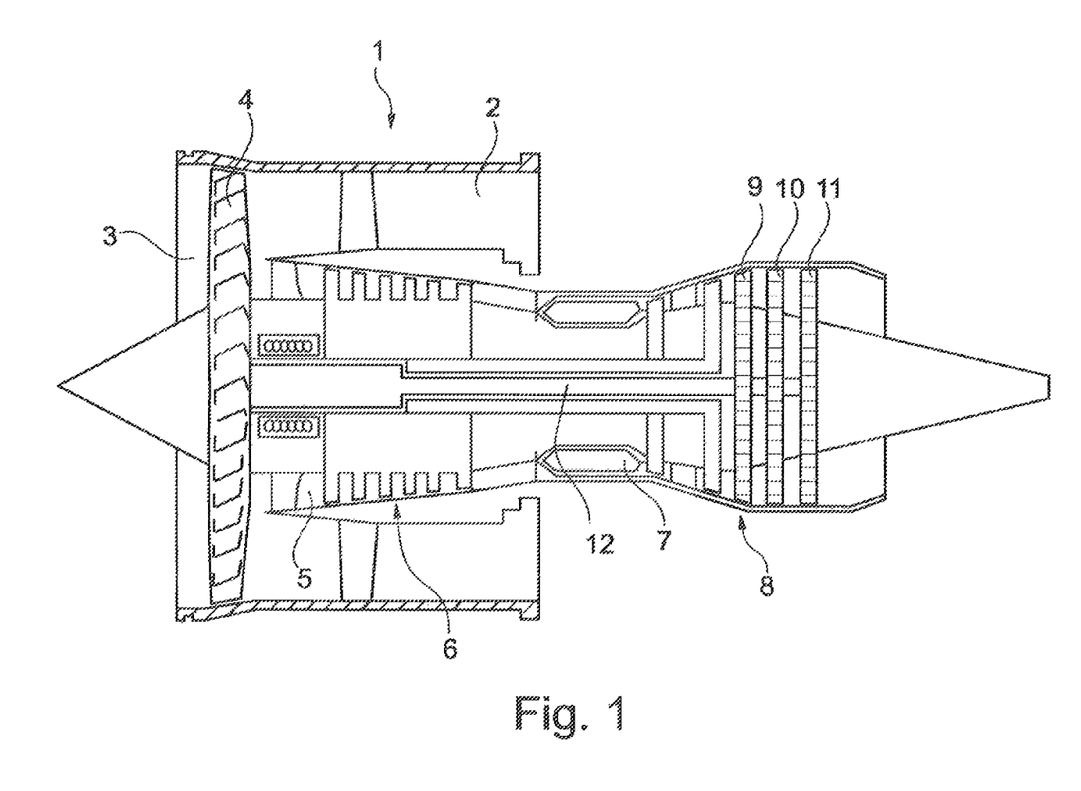
FIG. 1 shows a highly schematized longitudinal sectional view of a jet engine featuring a turbine provided with several rotor devices designed in accordance with the present invention.

FIG. 1 shows a jet engine 1 in a longitudinal sectional view. The jet engine 1 is designed with a bypass duct 2 and an intake area 3, with a fan 4 adjoining the downstream side of the intake area 3 in a manner known per se. Again downstream of the fan 4, the fluid flow in the jet engine 1 splits into a bypass flow and a core flow, with the bypass flow flowing through the bypass duct 2 and the core flow into an engine core 5 which is in turn designed in a manner known per se with a compressor device 6, a burner 7 and a turbine device 8.

The turbine device 8 has in this case three rotor devices 9, 10, 11 designed in a substantially comparable construction, where the rotor device 9 is described in more detail in the following and representatively for the other rotor devices 10, 11. The rotor device 9 shown in FIG. 2 in a sectional representation has a centrally arranged disk wheel 13 connected to an engine axis 12, on which a plurality of rotor blades 14 is arranged in radially outer areas on the circumferential side. The rotor blades 14 each have a blade root designed as a fir-tree root 15 and shown here only in schematic form, which is arranged inside one of the recesses 16 of the disk wheel 13 which run substantially in the axial direction in the disk wheel 13 and correlate with the fir-tree roots 15.

Figure 2:
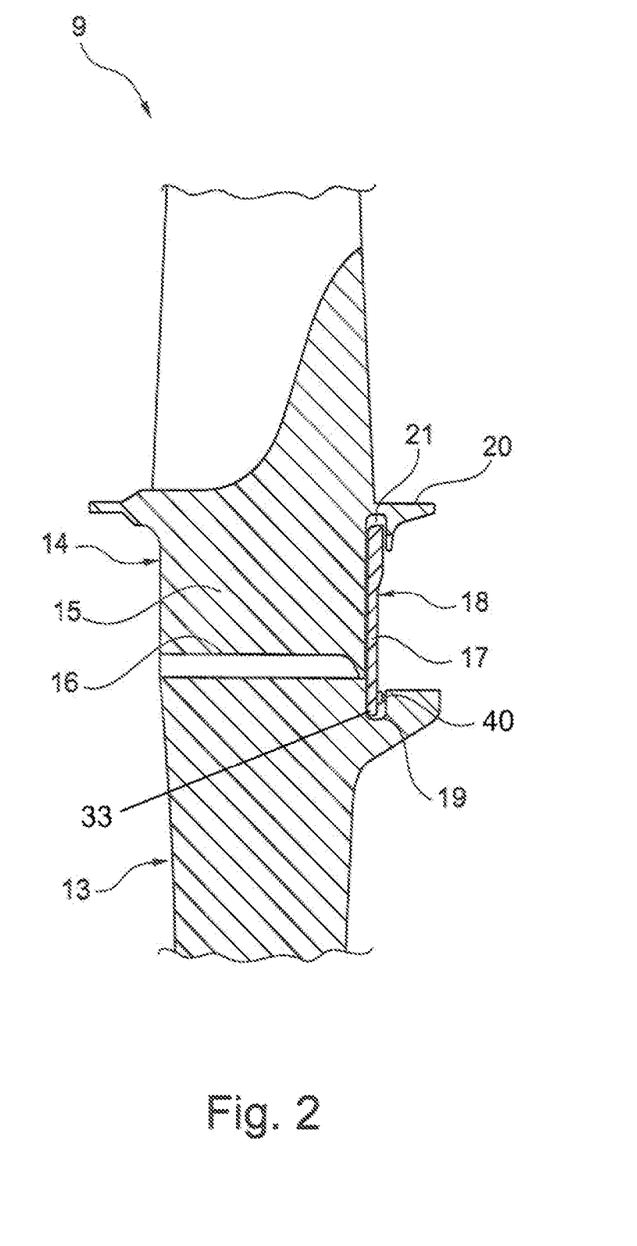
FIG. 2 shows a simplified sectional view of a rotor device as per FIG. 1 with a disk wheel and a rotor blade connected to said disk wheel, with the rotor blade being fixed via a locking segment to the disk wheel in the axial direction.

For axial locking of the rotor blades 14 relative to the disk wheel 13, a flat locking ring 18 designed with several locking segments 17 is provided, which in the area of the fir-tree roots 15 of the rotor blades 14 engages on one side in a groove 19 continuously arranged inside the disk wheel 13 and on the other side in grooves 21 of the rotor blades 14 arranged underneath an inner shroud 20 or a platform of the rotor blades 14 and extending in the circumferential direction of the disk wheel.

Figure 3:
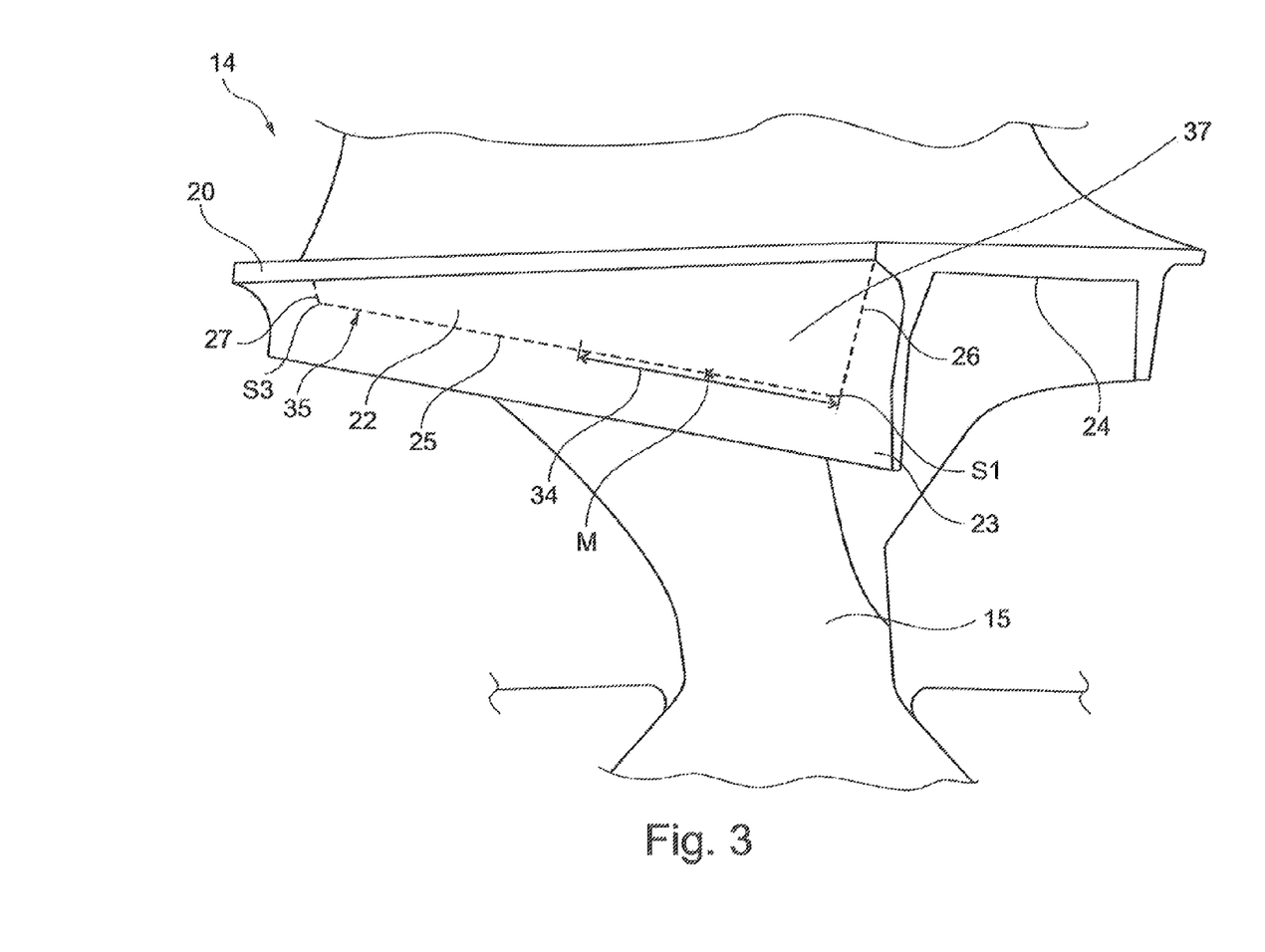
FIG. 3 shows a simplified three-dimensional view of the rotor blade in accordance with FIG. 2, with a groove of the rotor blade for the arrangement of a locking segment of the locking ring being shown in greater detail without curvature in the radial direction.

FIG. 3 shows in greater detail a section of the rotor blade 14 with a groove 21 extending in the circumferential direction of the disk wheel 13, said groove 21 having a profiled body 22 arranged underneath the inner shroud 20 running substantially concentrically to the engine axis 12 and designed in one piece with the rotor blade 14. The maximum depth of the groove 21 of the rotor blade 14 in the radial direction is formed by the bottom side of the inner shroud 20, the groove bottom 24. The toothed or saw-toothed profiled body 22 is arranged in the axial direction between the groove wall 23 of the groove 21 and the fir-tree root 15 and extends in this case over an entire width of the groove 21. Alternatively, the profiled body 22 can also extend only over one area of the width of the groove 21.

Relative to an extent of the rotor blade 14 in the circumferential direction, the profiled body 22 is arranged in a central area such that in the side areas of the groove 21 the latter adjoins the side surfaces of the rotor blade 14.

The profiled body 22 of the groove 21 forms a contour 35 including in cross-section in this case three rotor blade edges 25, 26, 27 extending in a straight line. A first rotor blade edge 25 extends, starting from a point S1 furthest distant from the groove bottom 24 in the radial direction and at an angle relative to the inner shroud 20 of the rotor blade 14, such that the first rotor blade edge 25 in this case is inclined in the same way as an outer groove wall 23 of the groove 21 in the axial direction relative to the inner shroud 20. The first rotor blade edge 25 has accordingly an angle relative to a tangent of the circumferential circle of the inner shroud 20 which passes through a center of the groove bottom 24 in the circumferential direction.

The point S1 represents an intersection point of the first rotor blade edge 25 with a second rotor blade edge 26, together forming a triangular area 37 of the profiled body 22. The intersection point S1 is in a rim area of the groove 21 of the rotor blade 14. Between the first rotor blade edge 25 and the second rotor blade edge 26, an angle of, in this case, about 90° is provided. The profiled body 22 is completed in cross-section by a third rotor blade edge 27 running between the first rotor blade edge 25 and the groove bottom 24.

The inclined design of the first rotor blade edge 25 of the profiled body 22 results in a linear increase of a thickness of the platform 20 enclosing the profiled body 22, starting from an intersection point S3 of the first rotor blade edge 25 with the third rotor blade edge 27 in the direction of the intersection point S1.

All rotor blades 14 are in this case each designed with a groove 21 and a previously described profiled body 22, where each profiled body 22 interacts in the installed position of the locking ring 18 with a locking segment 17 extending in the circumferential direction over three rotor blades 14.

Figure 4:
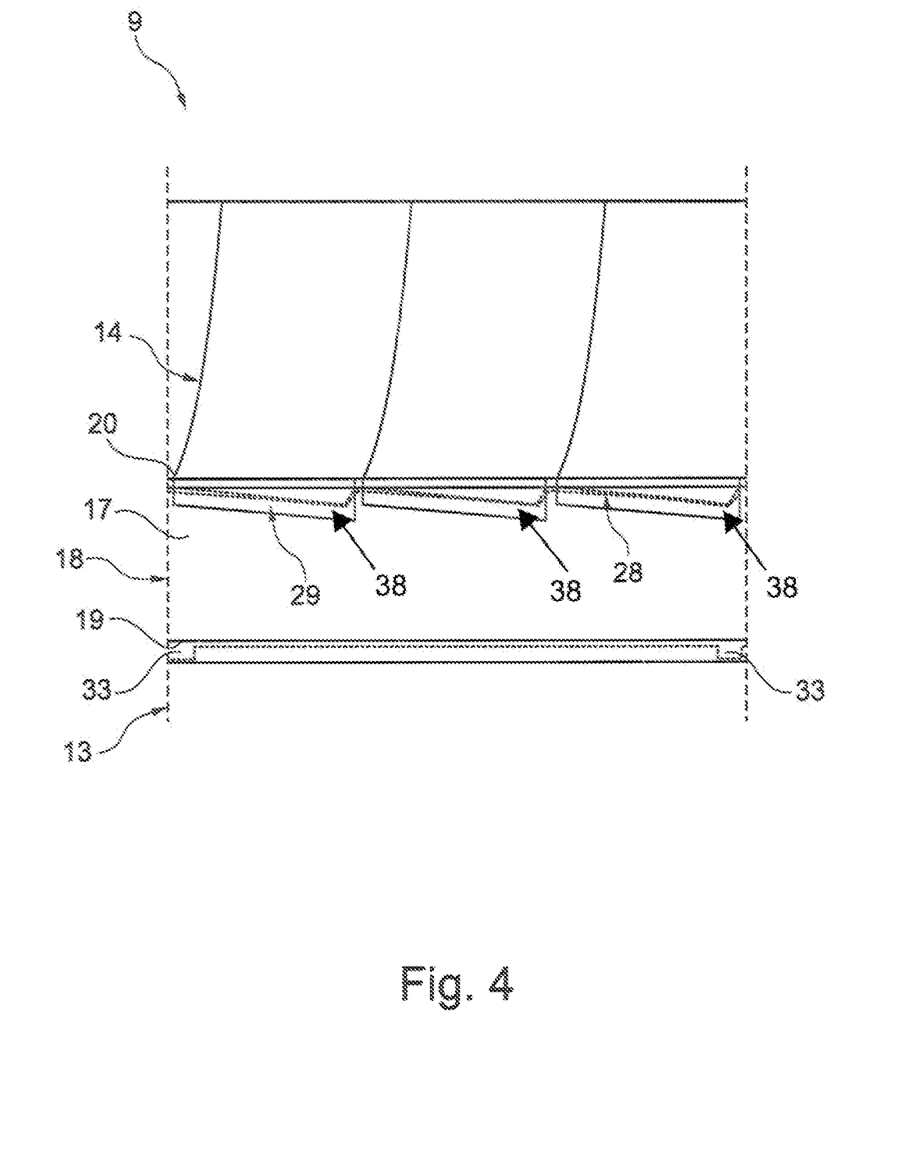
FIG. 4 shows a section of a simplified side view onto the rotor device as per FIGS. 1 to 3.
Figure 5:
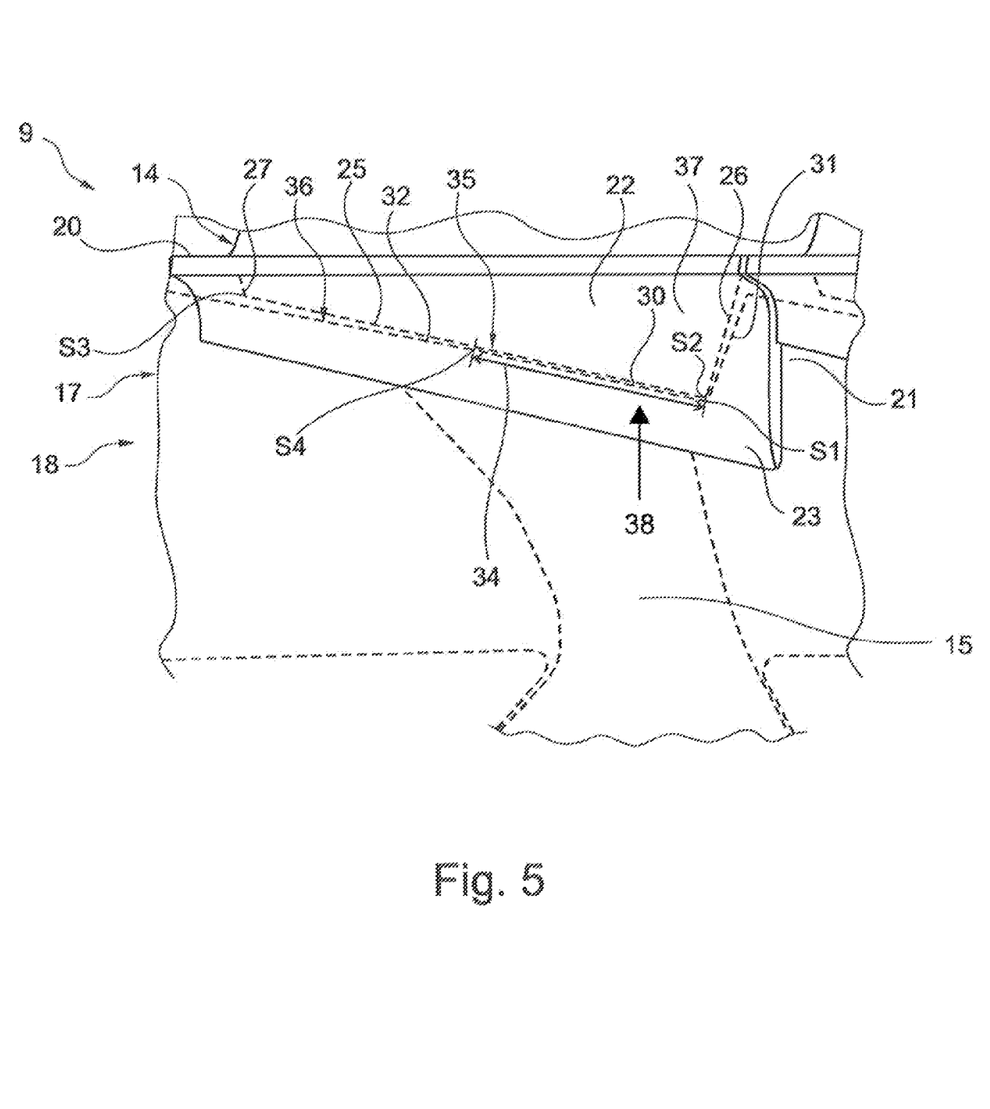
FIG. 5 shows a simplified representation of a section of the rotor device as per FIGS. 1 to 4, with an interaction of a locking segment of the locking ring with the rotor blade being shown in greater detail.

The locking segments 17 have to that end a saw-tooth profile 28 with three saw teeth 29, where in each case between a profiled body 22 of the rotor blades 14 and a saw tooth 29 of the locking segment 17 a positive fit is provided to prevent a relative movement between the rotor blades 14 and the locking segment 17. FIG. 4 and FIG. 5 each show a locking segment 17 and at least areas of rotor blades 14 and of the disk wheel 13 in a simplified representation. A curvature of the groove 19 and of the inner shroud 20 and of the locking segment 17 in the circumferential direction of the rotor device 9 is not shown in greater detail in FIG. 3 to FIG. 5, where the curvatures are at least approximately adapted to the curvature of the outer surface of the disk wheel 13 and designed substantially concentric to the engine axis 12.

Between each two saw teeth 29 of the locking segment 17, a triangular cutout 38 is provided which, to prevent a relative movement between the locking segment 17 and the rotor blade 14, positively interacts with the triangular area 37 of the profiled body 22 of the rotor blade 14 that forms a stop for the triangular cutout 38 between two saw teeth 29. In cross-section, the saw tooth 29 of the locking segment 17 is designed with at least three straight-line edges 30, 31, 32 forming a contour 36 facing the rotor blades 14.

The contour 36 of the locking segment 17 has a first locking segment edge 30 which in the installed position of the locking segment 17 runs parallel to the first rotor blade edge 25. The triangular cutout 38 between two saw teeth 29 is formed in the cross-sectional view by the first locking segment edge 30 together with a second locking segment edge 31, said edges being connected to one another via an intersection point S2.

An area of the locking segment 17 enclosing the intersection point S2 of the first locking segment edge 30 and of the second locking segment edge 31 interacts in the installed position of the locking segment 17 with the stop of the rotor blade 14 in the area of the intersection point S1 of the first rotor blade edge 25 with the second rotor blade edge 26, such that a movement of the locking segment 17 relative to the rotor blade 14 in the circumferential direction during operation of the rotor device 9 is prevented. The second locking segment edge 31 has in the installed position a small angle relative to the second rotor blade edge 26, such that there is an increasing distance between these edges 26, 31, starting from the intersection points S1 and S2, and it is ensured that the stop is in the area of the intersection point S1.

A third locking segment edge 32 adjoins an end of the first locking segment edge 30 facing away from the second locking segment edge 31 and also has, in the installed position of the locking segment 17, a small angle relative to the first rotor blade edge 25 such that there is a steadily increasing distance between the first rotor blade edge 25 and the third locking segment edge 32, starting from an intersection point S4 of the first locking segment edge 30 with the third locking segment edge 32.

The third locking segment edge 32 extends in the installed position of the locking segment 17 close up to the lower edge of the inner shroud 20 of the rotor blade 14 and beyond a transitional area between adjacent rotor blades 14, such that a good seal is achieved of the transitional area of the rotor blades 14.

A second locking segment edge 31 of a further saw tooth 29 of the same or of an adjacent locking segment 17 adjoins in turn the third locking segment edge 32, and is designed substantially comparable to the described saw tooth 29.

The first locking segment edge 30 forms together with the first rotor blade edge 25 in the installed position a contact area 34 between the locking segment 17 and the rotor blade 14. The contact area 34 extends from that point S1 of the contour 35 of the groove 21 of the rotor blade 14 which is furthest distant in the radial direction from the groove bottom 24, which determines a starting point of the contact area 34 up to the intersection point S4 of the first locking segment edge 30 with the third locking segment edge 32.

Over this defined contact area 34 the locking segments 17 are braced during operation of the jet engine 1 under a weight force on one or more rotor blades 14 and transmit forces acting in particular in the radial direction to the rotor blades 14. These forces arise due to high speeds in the operation of the engine 1 and generate high counter-forces in particular in the area of the fir-tree roots 15 of the rotor blades 14.

In order to prevent bending stresses that might arise due to an off-center arrangement of an actual contact surface between the locking segments 17 and the rotor blades 14 relative to the fir-tree root 15, the fir-tree roots 15 of the rotor blades 14 are arranged substantially in the circumferential direction centrally to a center M of the contact area 34 of the locking segments 17 with the rotor blades 14.

The contact area 34 between the rotor blade 14 and the locking segment 17 can here be positioned as required by an appropriate arrangement of the intersection point S1 and of a length of the first locking segment edge 30 in the circumferential direction, in order to achieve a required force transmission range.

Seen in the radial direction, the groove 21 of the rotor blade 14 and the locking segment 17 have surfaces facing one another and represented in the cross-sectional views by the rotor blade edges 25, 26, 27 and the locking segment edges 30, 31, 32. The respective intersection points S1, S2, S3, S4 of the edges 25, 26, 27, 30, 31, 32 represent surface edges running in the axial direction, with the edges formed by the intersection points S1 and S2 when the locking segment 17 is installed being at least approximately in contact with one another. The essentially plane surface of the rotor blade 14 enclosing the first rotor blade edge 25 runs substantially parallel to the essentially plane surface of the locking segment 17 enclosing the first locking segment edge 30 and forms with the latter a contact surface enclosing the contact area 34, in the area of which surface a force transmission takes place between the locking segment 17 and the rotor blade 14.

In addition to the covering of a gap between two adjacent rotor blades 14 by the locking segments 17, the disk wheel 13 is also protected by the inner shrouds 20 of the rotor blades 14 from the hot gas inside the engine 1. To assure a particularly reliable protection of the disk wheel 13 from the hot gas, sealing and/or damping elements, in particular so-called sealing wires not shown in greater detail, are provided for additional sealing between two adjacent rotor blades 14 in the area of the respective platform, by which elements the disk wheel 13, usually made from a temperature-sensitive material, is additionally protected.

Installation of the locking segments 17 is done substantially as in known solutions, where the locking ring 18 has pre-bent partial sections for creating a positive annular fit for the entire rotor blade set in the known manner. The locking segments 17 are inserted in the circumferential direction into the grooves 19, 21 of the rotor blades 14 and of the disk wheel 13. To secure the locking segments 17 into position in the radial direction, the locking segments 17 have in areas facing the groove 19 of the disk wheel 13 in each case at least one extension designed as a lip 33, which is bent over after insertion of the locking segments 17 into the grooves 19, 21 such that a radial extent of the locking segments 17 in the position of insertion into the grooves 19, 21 is greater than in a position intended for insertion into the grooves 19, 21. As a result, any clearance of the locking segments 17 in the radial direction is eliminated and the locking segments 17 are firmly fixed in the radial direction inside the grooves 19, 21. In this case, the locking segment 17 extending over three rotor blades 14 has two lips 33 which are each arranged in the circumferential direction inside a lateral area of the locking segment 17.

Alternatively, a spacer element 40 designed for example as a wire can be inserted in the circumferential direction of the groove 19 of the disk wheel 13.

LIST OF REFERENCE NUMERALS

1 Jet engine
2 Bypass duct

3 Intake area
4 Fan
5 Engine core
6 Compressor device
7 Burner
8 Turbine device
9, 10, 11 Rotor device
12 Engine axis
13 Disk wheel
14 Rotor blade
15 Fir-tree root
16 Recess
17 Locking segment
18 Locking ring
19 Groove of disk wheel
20 Inner shroud of rotor blade
21 Groove of rotor blade
22 Profiled body
23 Groove wall
24 Groove bottom
25 First rotor blade edge
26 Second rotor blade edge
27 Third rotor blade edge
28 Saw-tooth profile
29 Saw tooth
30 First locking segment edge
31 Second locking segment edge
32 Third locking segment edge
33 Lip
34 Contact area
35 Contour of groove of rotor blade
36 Contour of locking segment
37 Triangular area of profiled body
38 Triangular area of locking segment
M Center of contact area
S1 to S4 Intersection point

What is claimed is:

1. A rotor device for a jet engine, comprising:
a disk wheel having a plurality of substantially axially oriented recesses and a locking ring groove;
a plurality of rotor blades connected to the disk wheel, each rotor blade including a blade root positioned in one of the recesses, at least one of the rotor blades including rotor blade locking ring groove;
at least one looking segment positioned between the disk wheel locking ring groove and the rotor blade locking ring groove for axially locking the at least one of the rotor blades, the at least one locking segment engaging the rotor blade locking ring groove in a defined contact area of the rotor blade locking ring groove to prevent relative movement between the at least one of the rotor blades and the at least one locking segment;
wherein the rotor blade locking ring groove includes a tooth-shaped profiled body facing the at least one locking segment;
wherein the profiled body includes a triangular area as viewed in an axial direction and the at least on locking segment includes a counterpart area as viewed in the axial direction, the profiled body triangular area forming a stop for the at least one locking segment counterpart area to prevent a relative circumferential movement between the at least one of the rotor blades and the at least one locking segment.

2. The rotor device of claim 1, wherein the profiled body triangular area includes a first rotor blade edge inclined in a circumferential direction of the at least one of the rotor blades relative to a platform of the at least one of the rotor blades intersecting at a first intersection point a second rotor blade edge inclined outward in a direction toward a bottom of the rotor blade locking ring groove, the first intersection point being a portion of the profiled body triangular area extending furthest in a radial direction from the bottom, and wherein the at least one locking segment counterpart area includes a first locking segment edge and a second locking segment edge intersecting at a second intersection point to form a counterpart area triangular area, the profiled body triangular area engaging the counterpart area triangular area to form a stop for the counterpart area triangular area and prevent rotation of the at least one locking segment relative to the at least one of the rotor blades.

3. The rotor device of claim 2, wherein the first locking segment edge includes a portion running parallel to the first rotor blade edge to form a contact area between the at least one of the rotor blades and the at least one locking segment.

4. The rotor device of claim 3, wherein a center of the contact area is arranged approximately centrally to the blade root of the at least one of the rotor blades in the circumferential direction.

5. The rotor device of claim 2, wherein the at least one locking segment counterpart area includes a third locking segment edge intersecting the first locking segment edge on a side away from the second intersection point, the third locking segment edge extending at a spaced apart distance from the first rotor blade edge.

6. The rotor device of claim 5, wherein the third locking segment edge extends in the circumferential direction beyond a transitional area of an adjacent one of the plurality of rotor blades.

7. The rotor device of claim 6, wherein the at least one locking segment includes at least one extension in an area facing the disk wheel locking groove moveable between a first position for insertion of the at least one locking segment into the rotor device and a second position with the at least one locking segment inserted into the rotor device, wherein a radial extent of the at least one locking segment is greater when the at least one extension is in the second position than when the at least one extension is in the first position.

8. The rotor device of claim 5, wherein the at least one locking segment includes at least one extension in an area facing the disk wheel locking groove moveable between a first position for insertion of the at least one locking segment into the rotor device and a second position with the at least one locking segment inserted into the rotor device, wherein a radial extent of the at least one locking segment is greater when the at least one extension is in the second position than when the at least one extension is in the first position.

9. The rotor device of claim 2, wherein the second locking segment edge extends at a spaced apart distance from the second rotor blade edge.

10. The rotor device of claim 2, wherein at least one of the edges extends approximately in a straight line.

11. The rotor device of claim 2, wherein all of the edges extend approximately in straight lines.

12. The rotor device of claim 2, wherein the at least one locking segment includes at least one extension in an area facing the disk wheel locking groove moveable between a first position for insertion of the at least one locking segment into the rotor device and a second position with the at least one locking segment inserted into the rotor device, wherein a radial extent of the at least one locking segment is greater when the at least one extension is in the second position than when the at least one extension is in the first position.

13. The rotor device of claim 1, wherein each of the plurality of rotor blades includes a rotor blade locking ring groove including a profiled body and the at least one locking segment includes at least two locking segment counterpart areas for respectively engaging profiled bodies of two of the plurality of rotor blades.

14. The rotor device of claim 13, wherein the at least one locking segment includes at least one extension in an area facing the disk wheel locking groove moveable between a first position for insertion of the at least one locking segment into the rotor device and a second position with the at least one locking segment inserted into the rotor device, wherein a radial extent of the at least one locking segment is greater when the at least one extension is in the second position than when the at least one extension is in the first position.

15. The rotor device of claim 1, wherein the at least one locking segment includes at least one extension in an area facing the disk wheel locking groove moveable between a first position for insertion of the at least one locking segment into the rotor device and a second position with the at least one locking segment inserted into the rotor device, wherein a radial extent of the at least one locking segment is greater when the at least one extension is in the second position than when the at least one extension is in the first position.

16. The rotor device of claim 1, and further comprising a spacer element running in a circumferential direction and positioned between the at least one locking segment and the disk wheel locking ring groove.

17. The rotor device of claim 16, wherein the spacer element includes a wire.

18. A rotor device for a jet engine, comprising:
a disk wheel having a plurality of substantially axially oriented recesses and a locking ring groove;
a plurality of rotor blades connected to the disk wheel, each rotor blade including a blade root positioned in one of the recesses, at least one of the rotor blades including a rotor blade locking ring groove;
at least one locking segment positioned between the disk wheel locking ring groove and the rotor blade locking ring groove for axially locking the at least one of the rotor blades, the at least one locking segment engaging the rotor blade locking ring groove in a defined contact area of the rotor blade locking ring groove to prevent relative movement between the at least one of the rotor blades and the at least one locking segment;
wherein the at least one locking segment includes at least one extension in an area facing the disk wheel locking groove moveable between a first position for insertion of the at least one locking segment into the rotor device and a second position with the at least one locking segment inserted into the rotor device, wherein a radial extent of the at least one locking segment is greater when the at least one extension is in the second position than when the at least one extension is in the first position.

* * * * *